(12) United States Patent
Soffer et al.

(10) Patent No.: US 9,286,460 B2
(45) Date of Patent: Mar. 15, 2016

(54) USER AUTHENTICATION DEVICE HAVING MULTIPLE ISOLATED HOST INTERFACES

(76) Inventors: Aviv Soffer, Caesarea (IL); Oleg Vaisband, Kiryat Yam (IL)

( * ) Notice: Subject to any disclaimer, the term of this patent is extended or adjusted under 35 U.S.C. 154(b) by 285 days.

(21) Appl. No.: 13/586,117

(22) Filed: Aug. 15, 2012

(65) Prior Publication Data

US 2014/0053256 A1 Feb. 20, 2014

(51) Int. Cl.

| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/34* | (2013.01) |
| *G06F 21/41* | (2013.01) |
| *G06F 21/32* | (2013.01) |
| *G06F 21/85* | (2013.01) |
| *G06F 21/86* | (2013.01) |
| *G06F 21/31* | (2013.01) |
| *H04W 12/06* | (2009.01) |
| *G07F 7/10* | (2006.01) |
| *G06F 13/10* | (2006.01) |
| *G06Q 20/34* | (2012.01) |

(52) U.S. Cl.
CPC ............ *G06F 21/34* (2013.01); *G06F 21/32* (2013.01); *G06F 21/41* (2013.01); *G06F 21/85* (2013.01); *G06F 21/86* (2013.01); *G06F 13/105* (2013.01); *G06F 21/31* (2013.01); *G06Q 20/341* (2013.01); *G07F 7/1008* (2013.01); *H04W 12/06* (2013.01)

(58) Field of Classification Search
CPC ........ H04W 12/06; G06F 21/31; G06F 21/34; G06F 21/41; G06F 13/105; G06Q 20/341; G07F 7/1008

USPC .................... 726/9, 1–5, 16–17, 20
See application file for complete search history.

(56) References Cited

U.S. PATENT DOCUMENTS

| | | | | |
|---|---|---|---|---|
| 6,006,328 | A * | 12/1999 | Drake .............................. | 726/23 |
| 6,021,497 | A * | 2/2000 | Bouthillier et al. ............... | 726/5 |
| 6,402,032 | B1 * | 6/2002 | Huang et al. .................. | 235/441 |
| 6,457,641 | B1 * | 10/2002 | Reichardt ....................... | 235/441 |
| 6,615,264 | B1 * | 9/2003 | Stoltz et al. .................... | 709/227 |
| 6,708,893 | B2 | 3/2004 | Erfani et al. | |
| 7,036,738 | B1 * | 5/2006 | Vanzini et al. ................ | 235/486 |
| 7,260,726 | B1 * | 8/2007 | Doe et al. ....................... | 713/189 |
| 8,171,531 | B2 * | 5/2012 | Buer ................................ | 726/6 |
| 8,292,165 | B2 * | 10/2012 | Adams et al. ................. | 235/380 |
| 2003/0028653 | A1* | 2/2003 | New et al. ..................... | 709/229 |
| 2004/0250191 | A1* | 12/2004 | Leaming ....................... | 714/742 |
| 2005/0039027 | A1 | 2/2005 | Shapiro | |
| 2007/0050845 | A1* | 3/2007 | Das et al. ....................... | 726/17 |
| 2008/0010470 | A1 | 1/2008 | McKeon et al. | |
| 2008/0148059 | A1 | 6/2008 | Shapiro | |
| 2010/0071031 | A1* | 3/2010 | Carter et al. ..................... | 726/2 |
| 2010/0071059 | A1* | 3/2010 | Urasawa ......................... | 726/19 |
| 2010/0251353 | A1* | 9/2010 | Hodgkinson .................... | 726/9 |
| 2012/0205451 | A1* | 8/2012 | Poidomani et al. ........... | 235/492 |
| 2013/0332355 | A1* | 12/2013 | Atsmon et al. ................. | 705/41 |

* cited by examiner

*Primary Examiner* — Jayesh Jhaveri
(74) *Attorney, Agent, or Firm* — Browdy and Neimark, PLLC

(57) ABSTRACT

Devices and methods provide for enabling a user to use a single user authentication device such as smart-card reader, such that the user is capable of securely interfacing with two or more isolated computers and enabling the user to authenticate and remain authenticated at multiple computers at the same time. Once the user removes the smart-card from the smart-card reader, the authentication session on all coupled computers is terminated at once. The user authentication device comprises: an authentication module connected via a channel selection switch to one of a plurality of channels, each interfacing with a respective coupled computer.

18 Claims, 7 Drawing Sheets

Figure 1 (ART)

USER AUTHENTICATION DEVICE HAVING MULTIPLE ISOLATED HOST INTERFACES

FIELD OF THE INVENTION

The present invention relates to a device and a method that enables a computer user to securely use a single user authentication device for accessing multiple isolated computer systems.

BACKGROUND OF THE INVENTION

User authentication devices are essential security function in many organizations. Unauthorized access to the organization information system is a serious threat. As many organizations are forced to isolate their classified and non-classified networks to prevent data leakages, users are forced to authenticate in front of more than one computer. In many high security organizations the user may need to access four different computers simultaneously at his/her desktop to handle daily tasks. There are several solutions to enable such secure simultaneous access today:
1. The user uses one smart-card to authenticate in one of the several smart-card readers available at his/her desktop. This forces the user to log-off from other networks when logging on to a new one and therefore simultaneous use is not possible. This method is extremely uncomfortable to most users having such environment.
2. The user uses multiple smart-card—one card for each system. This method is simple but it adds additional responsibilities on the user. Users tends to forget their cards in the readers or to switch the cards unintentionally.

Both methods are not comfortable to the users and can cause severe security concerns.

To overcome these disadvantages, many high-security organizations are trying to avoid using user authentication devices on more than one network and therefore they are risking unauthorized access to some of these networks.

US20080148059A1: titled "Universal, Biometric, Self-Authenticating Identity Computer Having Multiple Communication Ports", discloses a portable device e.g. personal data assistant, for e.g. registering biometric profile, has output communication unit sending request, information or command to remote source by generating magnetic output.

US20080010470A1: titled "Tamper resistant module having separate control of issuance and content delivery" discloses a multi application IC card system for ATM and POS terminals compares the card personalization data with the application permissions data, whether application is loaded onto IC card depends on result of comparison.

US20050039027A1: titled "Universal, biometric, self-authenticating identity computer having multiple communication ports", discloses a smart identification device for use with e.g. personal digital assistant, has memory to store biometric profile corresponding to individual, and proximity antenna to communicate authentication signal to remote terminal.

US6708893: titled "Multiple-use smart card with security features and method", discloses a smart card for use in electronic mail system, has memory which includes algorithm to verify identity of proper user and membership of user, simultaneously.

SUMMARY OF THE EMBODIMENTS

What needed for overcoming the disadvantages of prior art is to provide a way for a user to use a single user authentication device such as smart-card reader, such that the user is capable of securely interfacing with two or more isolated computers and enabling the user to authenticate and remain authenticated at multiple computers at the same time. Once the user removes the smart-card from the smart-card reader, the authentication session on all coupled computers is terminated at once.

According to an exemplary embodiment of the current invention, a user authentication device for authenticating a user in front of a plurality of coupled computers using a single smart-card is provided, the apparatus comprising:
  at least two computer channels, each having:
    a computer interface, capable of interacting with a respective coupled computer;
    a smart-card reader function, capable of being coupled to said respective coupled computer via said computer interface, wherein said smart-card reader function is having a card-presence input;
    smart-card interface lines coupled to the said smart-card reader function;
  a smart-card connector capable of accepting a user authentication smart-card;
  a channel select switch having switchable ports, each coupled to one of said smart-card interface lines, and having common ports coupled to the said smart-card connector; and
  a card presence switch mechanically coupled to the said smart-card connector and electrically coupled to each one of said card-presence input of said smart-card reader function.

In some embodiments when the user removes the user smart-card from the device, all smart-card reader functions are configured to card removed state.

In some embodiments the channel select switch is manually controlled by the user.

In some embodiments the device further comprises a controller function capable of automatically switching said channel select switch based on access requests received from said smart-card reader functions that in turn receives requests from said respective coupled computers, and wherein said card-presence switch is coupled to the controller function.

In some embodiments the channel select switch is internal to said controller function, and wherein said smart-card connector is electrically coupled to the controller function.

In some embodiments the controller function is selected from the group consisting of: microcontroller, ASIC, PLD, discrete electronic circuitry and FPGA.

In some embodiments the computer interface protocol is selected from a group consisting of: serial, USB, and Thunderbolt.

In some embodiments the device is further comprising a biometric sensor, coupled through a channel select switching function into the said smart-card reader functions, and wherein said smart-card reader functions is further comprising of biometric identification processor capable of supporting user authentication with said biometric sensor.

According to another exemplary embodiment of the current invention, a user authentication apparatus for authenticating a user in front of a plurality of coupled computers, comprising:
  at least two computer channels, each having:
    a computer interface, capable of interacting with a respective coupled computer;
    a device emulator capable of emulating a user authentication device, and capable of being coupled to a respective coupled computer via said computer interface;

Input/output interface lines coupled to the said device emulator, capable of interacting with a host emulator;

a host emulator, capable of emulating a computer host to a user authentication device module;

a user authentication device module, coupled to the said host emulator; and a channel select switch having switchable ports coupled to each of said input/output interface lines, and having common ports coupled to said host emulator.

In some embodiments the device emulators are further coupled to said host emulator with bidirectional data lines to enable passing at least the following messages:

card inserted and card removed messages from said host emulator to said device emulators; and computer access requests from said device emulators to said host emulator.

In some embodiments the channel select switch is manually controlled by the user.

In some embodiments the apparatus is further comprising a controller function capable of automatically switches said channel select switch based on access requests received by device emulators from the said coupled computers.

In some embodiments:

said at least two computer channels, said a host emulator; and said channel select switch are integrated into a user authentication device; and said user authentication device further comprising a device port connected to said host emulator, said user authentication module is an external user authentication module, external to said user authentication device, and interacting with said device port.

In some embodiments the user authentication module comprises a smart card reader.

In some embodiments the user authentication module comprises a biometric reader.

In some embodiments the apparatus is further comprising a tampering detector capable of detecting attempt to tamper with the apparatus, and capable of disabling the operation of said apparatus once a tampering attempt was detected.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
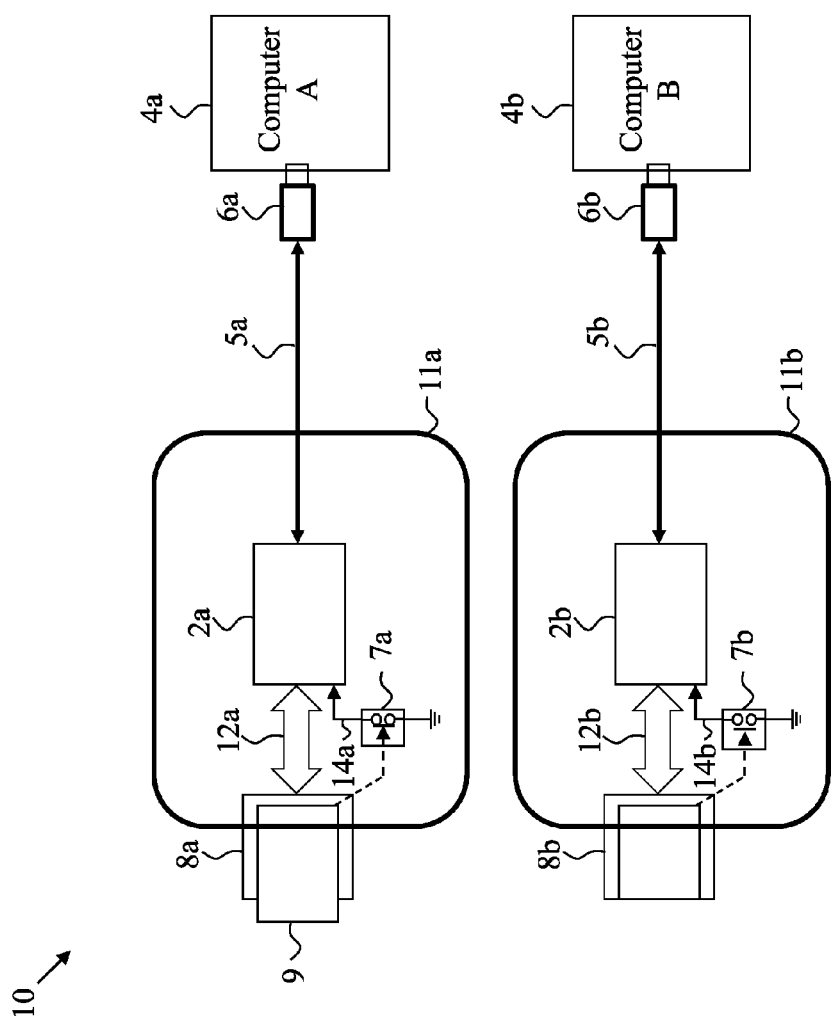
FIG. 1 illustrates a simplified drawing of a typical prior-art user desktop having two isolated smart-card readers coupled to two isolated computers.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as subroutines in an operating system, may be functions in an installed software package, and the like.

FIG. 1 illustrates an external diagram presenting of a prior-art user desktop system 10 having two isolated and identical smart-card reader functions 11a and 11b coupled to two isolated computers 4a and 4b through USB cables 5a and 5b and USB plugs 6a and 6b respectively.

The term isolated computers used here and in the following text describes two or more computers that are connected to separate independent networks. Such networks must not be bridged or connected to same computer due to internal organization policy and/or security level differences.

Smart-card readers 11x (in this and the following figures, x may stand for any of the letters a, b, etc.) may be standard contacts type complying with standards such as ISO7816 contact smart-card interface or contact-less type complying with standards such as ISO14443 contact-less smart-card interface. In this figure, and in the next figures, a contacts type smart-card reader is shown but with small modifications, which are apparent to the man skilled in the art, the embodiment of the current invention may serve as a contact-less smart-card reader or as a biometric smart-card reader (using match-on-card or other prior-art methods).

The internal components of the smart-card readers 11x are shown here to assist in the discussion of the present invention shown in the next figures.

Smart-card reader 11x is having a smart-card connector or slot 8x exposed to the user. The user inserts smart-card 9 into the smart-card connector or slot 8x, that is mechanically coupled to the card presence switch 7x. When smart-card 9 is fully inserted into the smart-card connector or slot 8x, the card presence switch 7x closes and thus it signal the smart-card reader functions 2x through lines 14x. The smart-card reader function 2x is coupled to the user smart-card 9 electrical interfaces through lines 12x and the electrical contacts inside smart-card connector or slot 8x. On the other side the smart-card reader function 2x interfaces with the coupled computer 4x through USB cable 5x and USB plug 6x. Coupled computer 4x may run specific application for user authentication or standard device driver such as PC/SC 2.0 driver.

Smart-card reader function 2x may be a standard reader chip like SCM/Identive Group SCR331 or NXP TDA8007BHL, or SMSC SEC1100 or may be standard, custom or general-purpose microcontroller, ASIC or FPGA.

Power to each one of the smart-card readers 11x circuitry and to the inserted user smart-card 9 is typically derived from the coupled computers 4x through the USB cable 5x.

Since, in this example, a single user is working with both computer 4a and computer 4b, two separate smart-card readers 11a and 11b are used. Due to security reasons it is not a good practice to issue two smart-cards to each user and therefore the user has to use a single smart-card 9 to interact with both systems. This type of use if very uncomfortable since when the user removes the smart-card 9 from the smart-card connector or slot 8a it automatically disconnect the authentication session in computer 4a. This prior-art system causes several concerns:

The user may be authenticated only at one computer at any time. When authenticated in computer 4b the user may miss all events and call on computer 4a and vice versa.

Authentication session takes time and this may reduce the user work efficiency as the user may need to often switch between computers.

There is a higher chance that the user will forget his/her smart-card in one of the readers.

It is possible to link the two computers 4a and 4b together using local network or other cable or wireless method but such connection is typically not allowed as computers 4x must be completely isolated. It should be noted here that computer and network isolation is the primary reason why many computer users are having multiple computers at the first place, and therefore any authentication method that may be abused to leak data between these computers is typically strictly prohibited.

What is needed is a device that will enable the user to simultaneously access multiple coupled computers while avoiding the risk of data leakages through the device.

Figure 2:
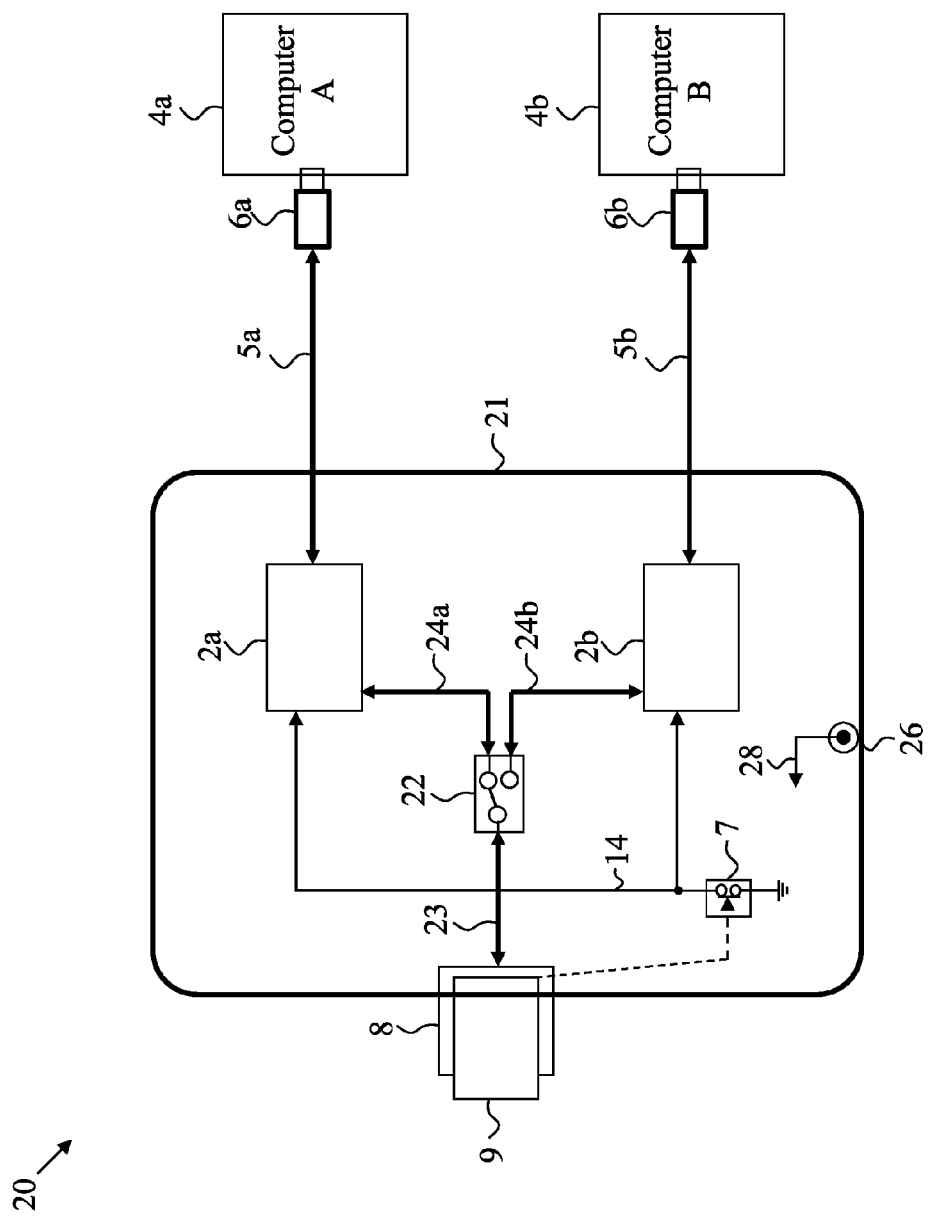
FIG. 2 illustrates a high-level block-diagram of an exemplary method and embodiment of the present invention having a single smart-card reader coupled to two isolated computers and manual channel switching means.

FIG. 2 illustrates a high-level block diagram of a system 20 having a single smart-card reader 21 according to an exemplary embodiment of the current invention coupled to two isolated computers 4a and 4b.

The smart-card reader 21 of the current invention is coupled to the two computers 4a and 4b through two USB cables 5a and 5b and via USB plugs 6a and 6brespectively. It should be noted that in this, and next figures, more than two computers 4x may be connected to the same smart-card reader by duplication of the relevant parts and expanding the switching capabilities. USB cables 5a and 5b are coupled to two independent smart-card reader functions 2a and 2b respectively. These smart-card reader functions may be a standard reader chip like SCM SCR331 or NXP TDA8007BHL, or may be a standard, custom or general-purpose microcontroller, ASIC or FPGA. The card interface of the smart-card reader functions 2x, 24a and 24b is coupled to the switchable side of a mechanical or solid-state two-positions switch 22 that switches the coupled user smart-card 9 inserted into the smart-card connector or slot 8 through lines 21. The user may manually switch between channel A and channel B by moving the switch 22 positions. The card-presence switch 7 is coupled to both smart-card reader functions 2a and 2b through card-presence inputs lines 14. When the user inserts the smart-card 9 to the smart-card connector or slot 8 it pushes the card-presence switch 7 and signals both smart-card reader functions 2x that the card is inserted.

When the user removes the smart-card 9 to the smart-card connector or slot 8 it releases the card-presence switch 7 and signals both smart-card reader functions 2x that the card is removed.

When the user want to authenticate in front of computer 4a, he/she inserts the smart-card 9 into the smart-card connector or slot 8 and switches the channel select switch 22 to channel A (as shown in FIG. 2). Smart-card 9 is now accessible to computer 4a through USB cable 5a, smart-card reader function 2a, lines 24a, channel select switch 22, lines 21 and smart-card reader connector or slot 8. Smart-card reader function 2a is also receiving input from the card-presence switch 7 through line 14 indicating that the card is inserted. Once the user is authenticated at computer 4a, he or she may switch to the second computer 4b by switching the channel select switch 22 to position B. At this position, smart-card 9 data and power lines are coupled through lines 23, channel select switch 22 and smart-card interface lines 24b into the second smart-card reader function 2b. This second smart-card reader function 2b is coupled though the USB cable 5b and USB plug 6b into computer 4b. At the same time smart-card reader function card-presence input still indicating that the card is inserted and therefore it does not disconnect the authentication session at computer 4a until user smart-card 9 is removed or until the user manually logs-off from the system (if policy allowing). Once the user was successfully authenticated at computer 4b, he or she is essentially authenticated simultaneously in front of both computers. Of course this method and apparatus may be scaled to any desirable number of computer channels as needed for the particular environment.

The use of standard smart-card reader function chips 2x with a common card-presence line may cause some technical difficulties. For example when smart-card 8 is first inserted into the smart-card connector or slot 8, and the channel select switch is positioned at first channel card, an error may appear in the second computer 4*b*. This error is caused by smart-card reader function chip 2*b* having card presence line 14 asserted while card interface lines 24*b* are isolated from the smart-card 9. An error may appear at the user display that requires user interaction. To prevent this and other errors, the following methods are used by exemplary embodiments of the current invention:

Software driver may be modified to disable such error messages;

Card presence line 14 may be divided into two lines controlled by certain logic or a microcontroller to prevent such errors (lines 47*a* and 47*b* seen in FIG. 3 below);and Special smart-card reader chips or special firmware may be used to disable such errors.

It should be noted here that although this process may support many user authentication configurations, some smart-card configurations may require re-authentication at predefined or random timing. Such configuration may not supported by this example of the embodiment of the current invention as only one smart-card reader chip is having access to the smart-card at any given time. Still other embodiments of the current invention may support this higher security configuration.

Power to the smart-card 9 may be supplied by the appropriate smart-card reader functions 2*x* and then switched through channel select switch 22, or may be continuously supplied from external DC power source through power jack 26 and line 26 to assure power independency between the two channels. Power to the smart-card reader function 2*x* is preferably or optionally supplied by the each coupled source respectively to assure isolation. Lines interconnecting the two smart-card reader functions 2*x* such as line 14 may further have data diodes to prevent any option for signaling between the two smart-card reader functions 2*x* that may cause data leakage between coupled host computers 4*x*.

Any dependency between the two channels may be abused in attempt to signal bits of data across the smart-card reader device 21 by computers 4*x* that are infected by malicious code. It is also possible to implement other power schemes such as internal battery, power from all USB through voltage regulators etc.

This relatively simple and low-cost exemplary embodiment of the current invention provides good isolation between the two connected hosts as other than the smart-card itself that assumed to be secured, there are no shared components in this system between the different computers. It should be noted here that the card presence line 14 is connected to both smart-card reader functions 2*x* in parallel. If there is a risk that one of the functions 2*x* will modulate this line to signal data into the other smart-card reader function 2*y*, it is possible to add two simple data-diodes on that line 14 that will prevent such linkage. Data-diodes may be opto-couplers, logic buffers or any other one-way buffering means.

Figure 3:
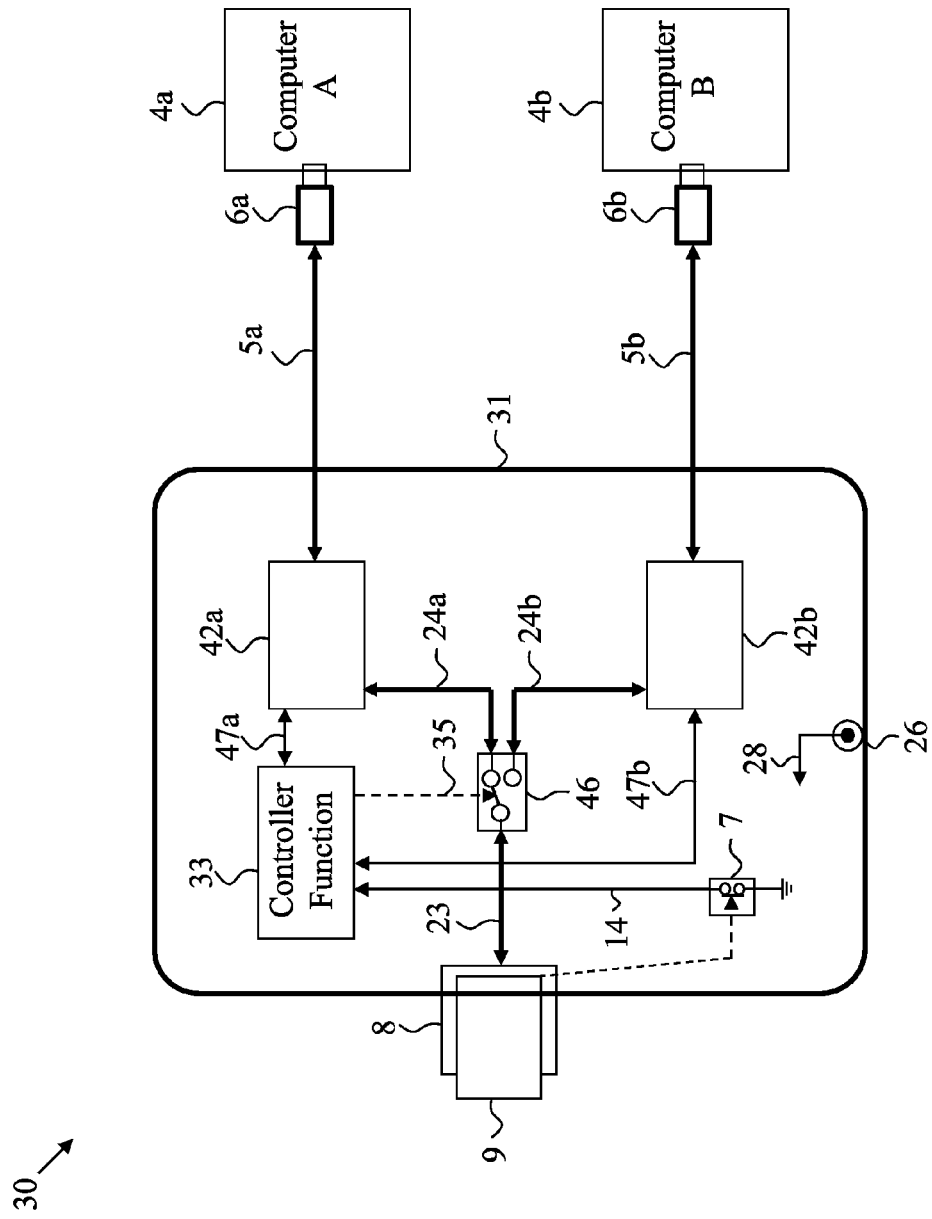
FIG. 3 illustrates a high-level block-diagram of yet another smart-card reader exemplary method and embodiment of the present invention having a microcontroller function to automatically control channel switching.

FIG. 3 illustrates a high-level block diagram of another smart-card reader system 30 according to an exemplary embodiment of the current invention. The smart-card reader device 31 of this exemplary embodiment of the current invention is similar to the device 21 of FIG. 2 above but it is further having a controller function 33 to automatically control the channel select switch 46. Channel select switch 46 is an electrical controlled device such as relay, solid-state multiplexer or internal logic circuitry inside the controller function 33. It is controlled through line 35 by the microcontroller function 33. In this embodiment of the current invention the device 31 switches automatically between the coupled computers 4*x* as needed. When coupled computer 4*x* issues a request to access the shared user smart-card 9, it signals this request through the USB cable 5*x* to the smart-card reader function 42*x*. The smart-card reader function 42*x* of this embodiment may be a standard smart-card reader chip similar to item 2*x* in FIG. 2 above, or it may be a customized version or general-purpose microcontroller as needed for the specific design. For example, if the coupled smart-card reader function 42*a* receives such request from its coupled computer 4*a*, it signals the request through lines 47*a* to the controller function 33. The controller function 33 then checks if the smart-card is not busy interacting with another computer. If it is not busy, it commands the channel select switch 46 through line 35 to switch to channel A. Once the switch was set the smart-card 9 electrical interfaces are coupled to computer 4*a*, through the smart-card connector or slot 8, lines 21, channel select switch 46, lines 24*a*, smart-card reader function 42*a*, USB cable 5*a* and USB port 6*a*.

In this exemplary embodiment of the current invention the microcontroller function 33 serves as an arbiter between the coupled computers and the shared smart-card 9 interface. Arbitration scheme may be as simple as first requested—first served or may implement a complex requests queue while sending busy status back to the smart-card reader chips 42*x* through same lines 47*x*. Arbitration may be needed in order to handle multiple card access requests from the different coupled computers at random timing if needed. Once the smart-card 9 is removed from the smart-card connector or slot 8 the card-presence switch 7 is released and this signals the controller function 33 through line 14. Microcontroller then signals the two smart-card reader functions 42*x* to disconnect the authentication sessions in the coupled computers 4*x*.

It should be noted that in some embodiments of the current invention the controller function 33 may be a general-purpose microcontroller, ASIC, FPGA or any other electronic circuitry capable of handling service requests and managing the smart-card interfaces. In some embodiments of the current invention, other functions such as the channel select switch 46, smart-card reader functions 42*x* may be integrated into a single component to reduce the components count and the device costs. Controller function 33 may have security means such as firmware on ROM (Read Only Memory) or code protection to prevent attempts to attack this shared resource to leak information. In addition active anti-tampering may be added to prevent physical tampering of the device enclosure (21, 31, 41, 51, 61, and 71 in FIGS. 2, 3, 4, 5, 6, and 7, respectively) during product transit or during product service as shown in FIG. 4 below.

Figure 4:
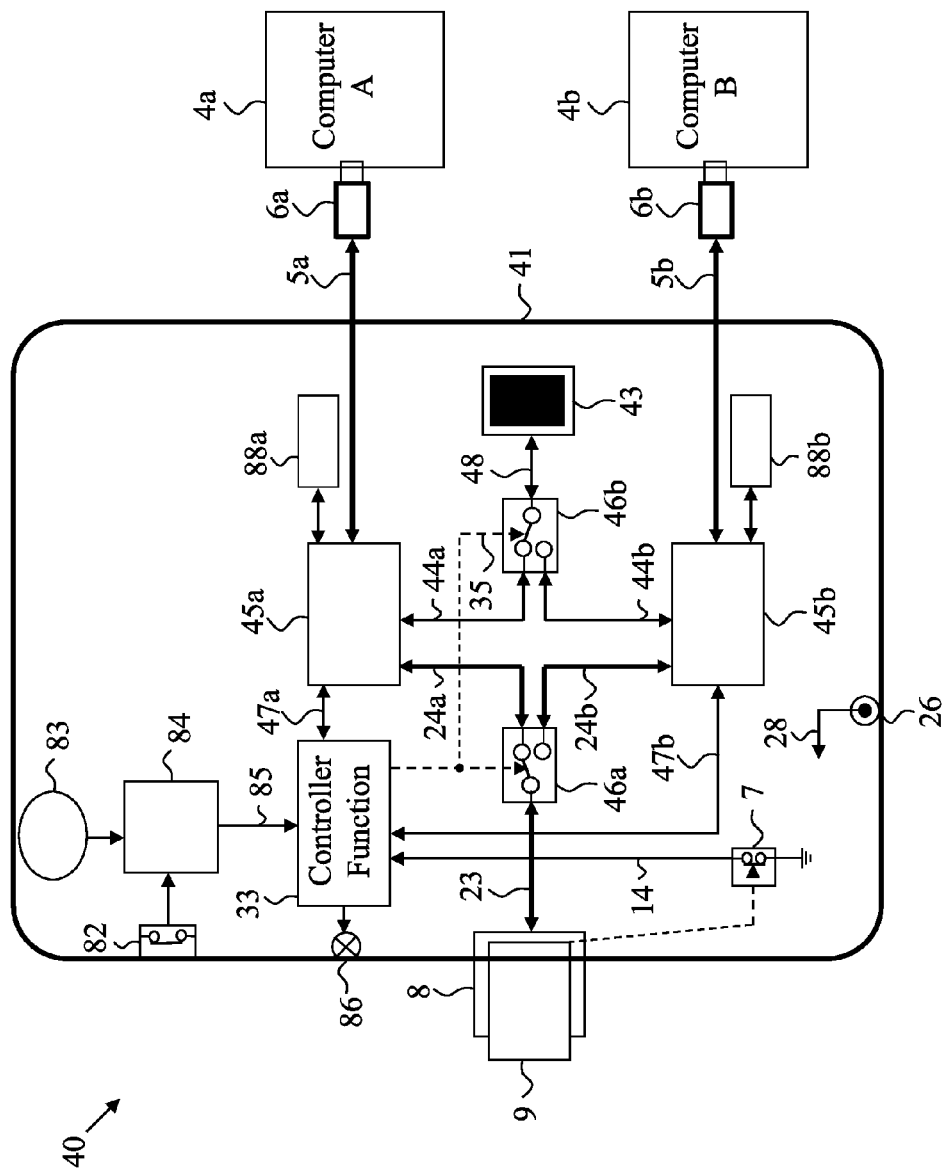
FIG. 4 illustrates a high-level block-diagram of another exemplary method and device similar to FIG. 3 above having an additional biometric sensor according to the current invention.

FIG. 4 illustrates a high-level block diagram of another smart-card system 40 exemplary embodiment of the current invention similar to system 30 of FIG. 3 wherein device 41 further comprises of a biometric sensor 43. Biometric sensor 43 may be fingerprint sensor, face recognition, iris sensor or any other suitable biometric user authentication device sensor. Biometric sensor 43 electrical interfaces are coupled through lines 48 into another channel select switch 46*b*. This channel select switch is couple through line 35 to channel select switch 46*a* and driven by the controller function 33. When the shared user smart-card 9 is coupled to channel A, the shared biometric sensor 43 is also coupled to channel A through channel select switch 46*b*. In this embodiment of the current invention, the smart-card reader function 45*x* is also having an additional biometric identification function that is coupled to the shared biometric sensor 43 through lines 44*a* and 44*b* and channel select switch 46*b*.

This embodiment of the current invention enables the user to authenticate in front of one computer with both smart-card and biometric sensor and then to authenticate in front of another computer while remain authenticated at the first computer.

Optionally, each of computers 4x may have different authentication requirements. For example, computer 4a may require only the presence of smart-card 9 for authenticating the user, computer 4b may require only the correct biometric response of biometric sensor 43 for authenticating the user, while computer 4c (not seen in this figure) may require both the presence of smart-card 9 for and the correct biometric response of biometric sensor 43 for authenticating the user.

In an embodiment of the present invention the device 41 is optionally further equipped with active anti-tampering function 84. This function uses low power microcontroller or discrete components to sense mechanical intrusion attempt through sensor such as switch 82. When switch 82 is interrupted, the anti-tampering function 84 senses this transition and triggers a chain of events through line 85 that cause the following effects through controller function 33:
  a. Device 41 is disabled permanently—it cannot be used to read smart-cards anymore.
  b. Device provides clear user indications of the tampered state. These indications typically include blinking action of LED 86.

Coin battery or super-capacitor 83 provides backup power for the anti-tampering function 84 and sensor 82 to enable detection even when the device is unpowered (for example during shipment). Addition means such as tamper evident labels may be used to provide visual indications of the tampering attempt.

It should be noted that the active anti-tampering function may be critical to assure that product was not tampered with modified or extra circuitry to provide a covert data leakage channel between the two coupled computers.

In an embodiment of the present invention the device 41 is optionally further equipped with a Trusted Platform Module (TPM) or authentication devices 88a and 88b that are coupled to smart-card reader and biometric identification functions 45a and 45b respectively to enable strong trust and authentication between each coupled host computer 4x and its respective smart-card reader and biometric identification functions 45x. Additionally, alternatively and optionally, embodiments of the current invention may comprise physical tampering deterrent or detection means such as security seals, permanent closure of the case, etc.

Figure 5:
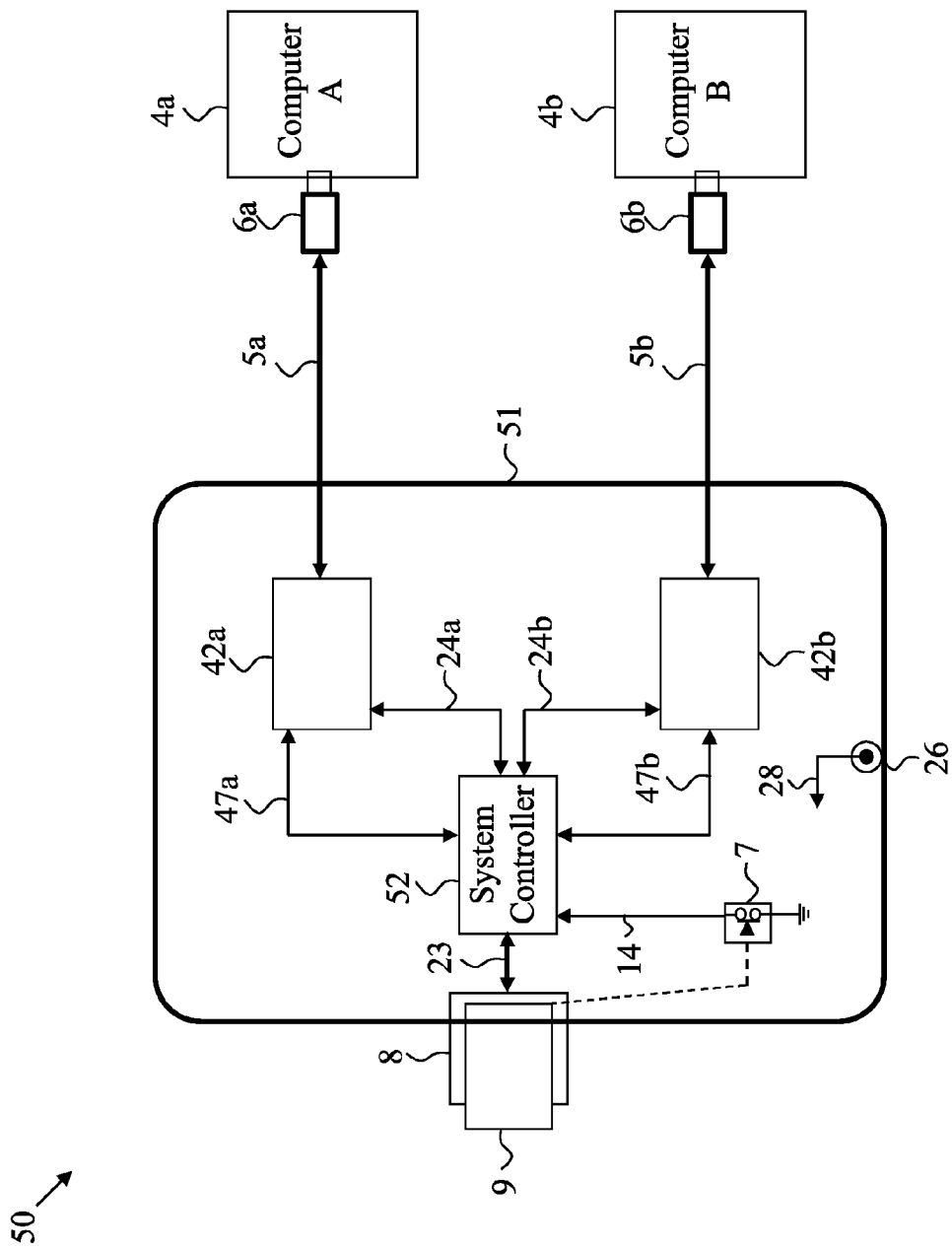
FIG. 5 illustrates a high-level block-diagram of yet another exemplary method and device of the current invention having a system controller function instead of channel select switch.

FIG. 5 illustrates a high-level block diagram of another smart-card system 50 wherein smart-card reader device 51 the channel select switching function and the controller function 33 of FIG. 3 above were integrated into one component called here system controller 52. In some optional embodiments of the current invention the system controller 52 may be a general-purpose microcontroller, an ASIC, FPGA or any other circuitry capable of switching and managing the access requests and the smart-card traffic. System controller 52 is coupled to the smart-card 9 interfaces through lines 23 and smart-card connector or slot 8. It is further coupled to the smart-card reader functions 42a and 42b through bidirectional lines 47a and 47b respectively.

Channel select switching function is done internally inside the system controller 52. This exemplary embodiment of the current invention typically offering enhanced reliability and lower manufacturing costs. Controller function 52 may have security means such as firmware on ROM (Read Only Memory), code protection or active anti-tampering to prevent attempts to attack this shared resource to leak information.

Figure 6:
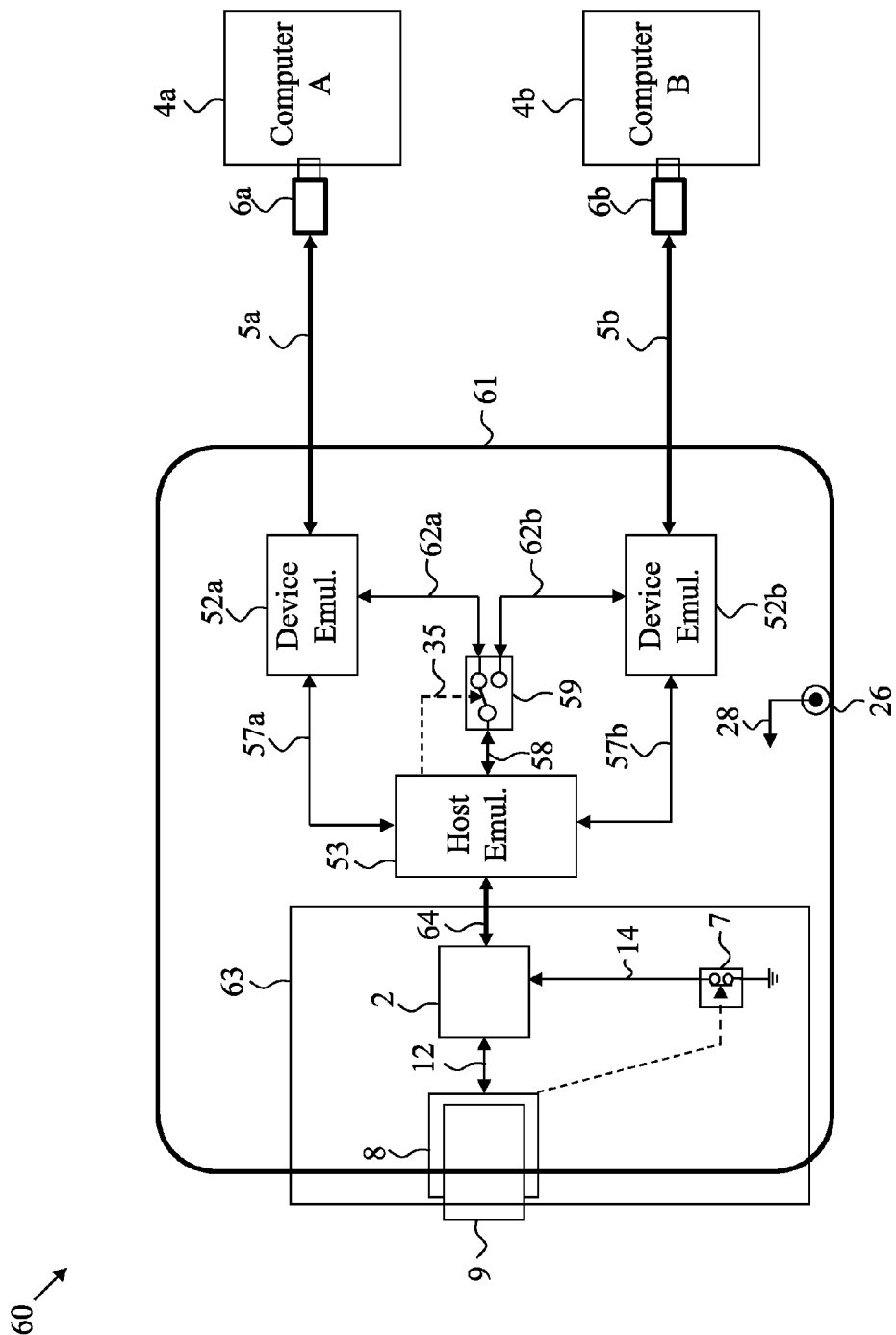
FIG. 6 illustrates a high-level block-diagram of an exemplary method and embodiment of the present invention having host and device emulators and an integrated smart-card reader module.

FIG. 6 illustrates a high-level block diagram of yet another smart-card reader system 60 having a smart-card reader device 61 according to yet another exemplary embodiment of the current invention. This smart-card reader 61 is having one host emulator 53 coupled to two device emulators 52a and 52b. Host emulator 53 emulates the PC side USB stack to the smart-card reader module 63. Smart-card reader module 63 is similar to the prior-art smart-card readers 11x shown in FIG. 1 above. Smart-card reader module 63 is coupled to the host emulator 53 through internal bus 64 implemented as USB, SPI bus, serial interface or any other interconnect bus.

Host emulator 53 enumerates the smart-card reader module 63 and interacts with it just like a PC host. On the other side of the host emulator 53 the smart-card reader traffic is passed through the bi-directional data bus 58, through the channel select switch 59, through lines 62a and 62b into the device emulators 52a and 52b respectively. Device emulators 52a and 52b are coupled to computers 4a and 4b through the USB cables 5a and 5b and through the USB connectors 6a and 6b respectively. Channel select switch 59 is controlled through line 35 by the host emulator 53 in response to access requests from the device emulators 52a and 52b. Device emulators 52a and 52b are communicating with the host emulator 53 through bi-directional lines 57a and 57b respectively. These bi-directional lines 57x are used to pass service requests from device emulators to the host emulators 53 and to pass card insertion—removal events from the host emulator 53 to the device emulators 52x. This exemplary embodiment of the current invention enables continues communications between the coupled computers 4x and the shared smart-card through emulation. This type of device may support a wider range of user authentication devices other than smart-card readers. It may also support external user authentication devices as will be shown in the next figure.

Figure 7:
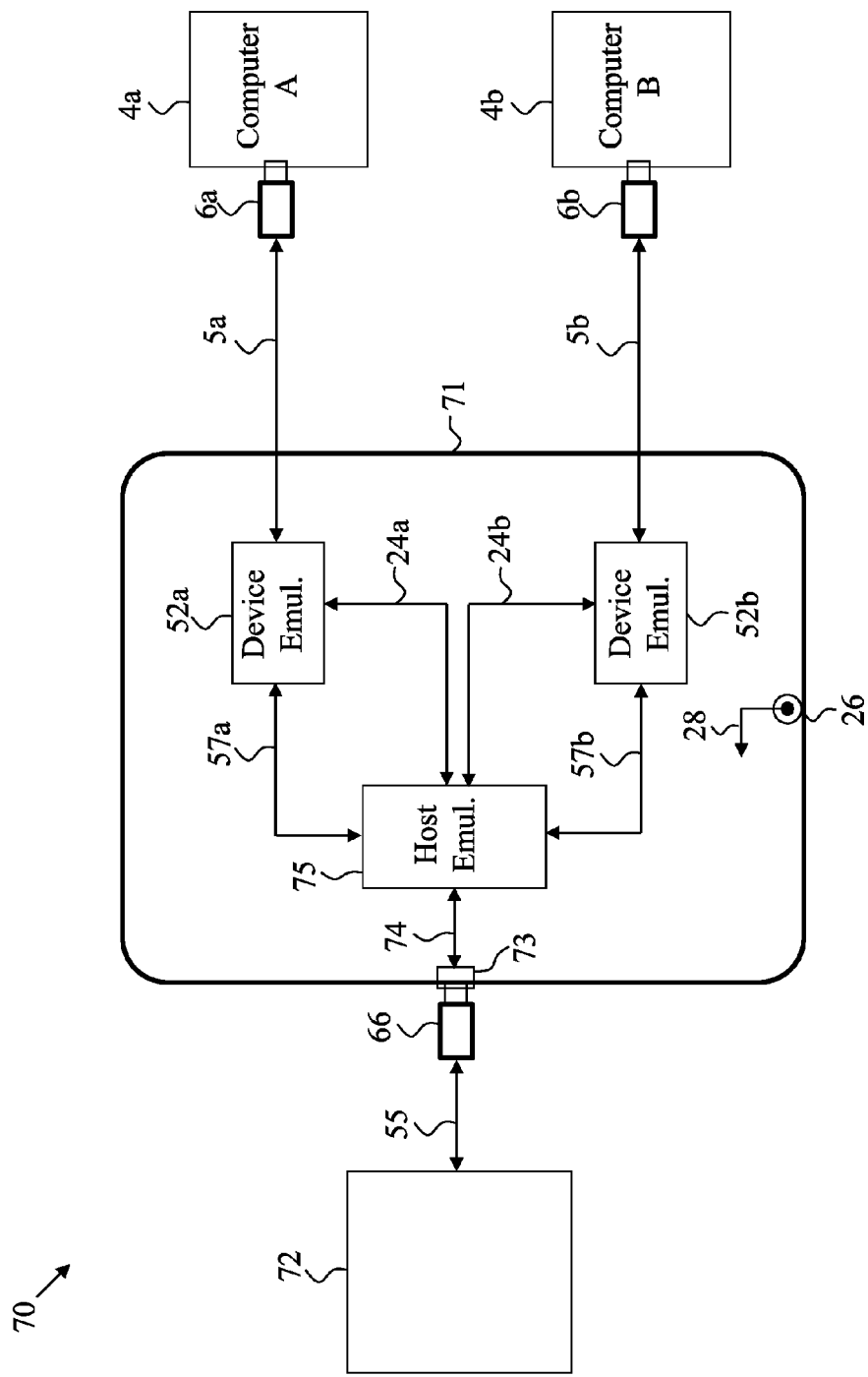
FIG. 7 illustrates a high-level block-diagram of another exemplary method and embodiment of the present invention having host and device emulators and an external user authentication device.

FIG. 7 illustrates a high-level block-diagram of an exemplary method and embodiment of the present invention having external user authentication device and two coupled computers.

This exemplary embodiment of the current invention is showing a smart-card reader security device 71 that is similar to the smart-card reader 61 of FIG. 6 above, but instead of having a built-in smart-card reader module 63, the user authentication device 72 is an external device. User authentication device 72 may be a smart-card reader, a biometric reader or a combination of the two. It is coupled to the smart-card reader security device 71 through USB cable 55, USB plug 66, user-authentication device USB port 73, USB lines 74 to the host emulator 75. Host emulator 75 emulating the USB stack needed for supporting the coupled user authentication device 72. Host emulator 75 routes the user authentication device traffic into the two device emulators 52a and 52b via the bi-directional lines 24a and 24b respectively. This implementation of the current invention does not require channel select switch 46 of FIG. 5 above as routing to individual channel is controlled directly by the host emulator 75.

Host emulator 75 may have security means such as firmware on ROM (Read Only Memory), active anti-tampering or code protection to prevent attempts to attack this shared resource to leak information.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A user authentication device for authenticating a user in front of a plurality of isolated coupled computers using a single smart-card, the device comprising:
   at least a first computer channel having:
      a first computer interface configured to interact with a respective coupled first computer;
      a first smart-card reader function configured to be coupled to said respective coupled first computer via said first computer interface, wherein said first smart-card reader function has a first card-presence input; and
      first smart-card interface line coupled to said first smart-card reader function; and
   at least a second computer channel having:
      a second computer interface configured to interact with a respective coupled second computer;
      a second smart-card reader function coupled to said respective coupled second computer via said second computer interface, wherein said second smart-card reader function has a second card-presence input; and
      a second smart-card interface line coupled to said second smart-card reader function;
   the device further comprising:
      a smart-card connector configured to receive a user authentication smart-card;
      a channel select switch having common ports coupled to said smart-card connector and at least a first and a second switchable ports, wherein said at least a first and a second switchable ports are each coupled to the corresponding one of said first and said second smart-card interface lines;
      a card presence switch, mechanically coupled to said smart-card connector and electrically coupled to said at least first and said second card-presence inputs of said at least first and second smart-card reader functions respectively; and
      an enclosure enclosing at least said at least first and second smart-card reader functions, said at least first and second smart-card interface lines, and said channel select switch,
      wherein said at least first and second smart card reader functions are configured to concurrently authenticate, each in front of the corresponding one of said at least first and second coupled computers,
      wherein said at least first and second smartcard reader functions remain concurrently authenticated during selection of any of said at least a first and a second switchable ports by the channel select switch, and
      wherein said first coupled computer and said second coupled computers remain isolated from each other while coupled to the user authentication device.

2. The device of claim 1, wherein upon removal of the user smart-card from the device, all smart-card reader functions are configured to card removed state.

3. The device of claim 1 wherein said channel select switch is manually controlled by the user.

4. The device of claim 1, further comprising a controller function configured to automatically switch said channel select switch based on access requests received from said smart-card reader function that in turn receives requests from said respective coupled computer, and wherein said card-presence switch is coupled to the controller function.

5. The device of claim 4, wherein said channel select switch is internal to said controller function, and wherein said smart-card connector is electrically coupled to the controller function.

6. The device of claim 4, wherein said controller function is selected from the group consisting of: microcontroller, ASIC, PLD, discrete electronic circuitry and FPGA.

7. The device of claim 1, wherein each of said first and said second computer interface uses a separate cable to connect to the respective coupled computer using a protocol that is selected from a group consisting of: serial, USB, and Thunderbolt.

8. The device of claim 1, further comprising a biometric sensor coupled to said smart-card reader function through a channel select switching function, and wherein said smart-card reader function further comprises a biometric identification processor configured to support user authentication with said biometric sensor.

9. A user authentication apparatus for authenticating a user in front of a plurality of coupled computers, comprising:
- a host emulator configured to emulate a computer host to a coupled user authentication device module;
- at least two computer channels, each of said at least two computer channels each having:
  - a computer interface configured to interact with a respective coupled computer of the plurality of coupled computers;
  - a device emulator configured to emulate a user authentication device, and configured to be coupled to said respective coupled computer via said computer interface; and
  - input/output interface lines coupled to said device emulator, wherein said input/output interface lines are configured to interact with said host emulator; and
- a channel select switch having switchable ports coupled to each of said input/output interface lines, and having common ports coupled to said host emulator; and
- an enclosure enclosing at least: said host emulator, said channel select switch, said input/output interface lines, and said device emulators,
- wherein said at least first and second smart card reader functions are configured to concurrently authenticate, each in front of the corresponding one of said at least first and second coupled computers,
- wherein said at least first and second smartcard reader functions remain concurrently authenticated during selection of any of said switchable ports by the channel select switch, and
- wherein said first coupled computer and said second coupled computers remain isolated from each other while coupled to the user authentication device.

10. The device of claim 9, wherein the device emulators are further coupled to said host emulator with bidirectional data lines to enable passing at least the following messages:
- card inserted and card removed messages from said host emulator to the device emulators; and
- computer access requests from the device emulators to said host emulator.

11. The apparatus of claim 9, wherein said channel select switch is manually controlled by the user.

12. The apparatus of claim 9, further comprising a controller function configured to automatically switch said channel select switch based on access requests received by the device emulators from the coupled computers.

13. The apparatus of claim 9, wherein said at least two computer channels, said host emulator, and said channel select switch are integrated into said user authentication device; and wherein said user authentication device further comprises a device port located on said enclosure and connected to said host emulator; said device port is for connecting the authentication device to an external user authentication module that is external to said user authentication device, and wherein said user authentication device module is interacting with said device port.

14. The apparatus of claim 13, wherein said user authentication device module comprises a smart card reader.

15. The apparatus of claim 13, wherein said user authentication device module comprises a biometric reader.

16. The apparatus of claim 9, and further comprising a tampering detector configured to detect attempt to tamper with the apparatus, and permanently disabling the user authentication apparatus once a tampering attempt was detected.

17. The apparatus of claim 12, wherein said at least one of said channel select switch and said host emulator is integrated within said controller function.

18. The apparatus of claim 1, wherein said first coupled computer and said second coupled computer are coupled to separate networks.

* * * * *